(12) United States Patent
Chevalier et al.

(10) Patent No.: US 9,976,439 B2
(45) Date of Patent: May 22, 2018

(54) METHOD FOR DIFFERENTIATING CONTROL FAILURES IN A SYSTEM FOR CONTROLLING AN ACTUATOR, IN PARTICULAR OF A STATOR OF A GAS-TURBINE ENGINE

(71) Applicant: SNECMA, Paris (FR)

(72) Inventors: Severine Chevalier, Moissy-cramayel (FR); Jose Roland Rodrigues, Moissy-cramayel (FR); Alain Tiepel, Moissy-cramayel (FR)

(73) Assignee: SNECMA, Paris (FR)

( * ) Notice: Subject to any disclaimer, the term of this patent is extended or adjusted under 35 U.S.C. 154(b) by 497 days.

(21) Appl. No.: 14/437,489

(22) PCT Filed: Sep. 24, 2013

(86) PCT No.: PCT/FR2013/052238
§ 371 (c)(1),
(2) Date: Apr. 21, 2015

(87) PCT Pub. No.: WO2014/049260
PCT Pub. Date: Apr. 3, 2014

(65) Prior Publication Data
US 2015/0285092 A1 Oct. 8, 2015

(30) Foreign Application Priority Data

Sep. 26, 2012 (FR) ...................................... 12 59038

(51) Int. Cl.
*F01D 17/16* (2006.01)
*F02C 9/20* (2006.01)
*F01D 21/00* (2006.01)

(52) U.S. Cl.
CPC ......... *F01D 17/162* (2013.01); *F01D 21/003* (2013.01); *F02C 9/20* (2013.01); *F05D 2260/80* (2013.01); *F05D 2260/84* (2013.01)

(58) Field of Classification Search
CPC ........ F01D 17/162; F01D 21/003; F02C 9/20; F05D 2260/80; F05D 2260/84
See application file for complete search history.

(56) References Cited

U.S. PATENT DOCUMENTS

| | | | | |
|---|---|---|---|---|
| 5,938,401 A | * | 8/1999 | Modeen | F01D 17/16 415/118 |
| 6,341,238 B1 | * | 1/2002 | Modeen | F01D 17/16 415/118 |
| 9,726,035 B2 | * | 8/2017 | Ratke | F02D 41/0007 |

FOREIGN PATENT DOCUMENTS

| | | |
|---|---|---|
| EP | 1988 258 A2 | 11/2008 |
| FR | 2 963 948 A1 | 2/2012 |

* cited by examiner

*Primary Examiner* — Woody Lee, Jr.
*Assistant Examiner* — Adam W Brown
(74) *Attorney, Agent, or Firm* — Womble Bond Dickinson (US) LLP

(57) ABSTRACT

The present invention relates to a method for differentiating control failures in a system for controlling an actuator (14) determining the position of a member for modifying the state of a gas-turbine engine, the system including a single- or dual-channel electric control and a mechanical control, the electric control including one computer (10, 10') per channel, only one of which is active at any given time in order to calculate the set position of the movable member of the actuator (14) and to transmit a set signal to the single-channel mechanical control of the actuator, a failure being diagnosed when a deviation is detected between the set position of the movable member of the actuator and the position thereof measured during a predetermined deviation (Continued)

confirmation time. The method is characterised in that the speed of movement of the actuator is measured and in that the system diagnoses an electrical failure when, during said time for confirming the deviation, the measured speed of movement is other than zero and remains higher than a predetermined threshold speed; otherwise, the failure is diagnosed as being of temporary mechanical origin.

6 Claims, 1 Drawing Sheet

METHOD FOR DIFFERENTIATING CONTROL FAILURES IN A SYSTEM FOR CONTROLLING AN ACTUATOR, IN PARTICULAR OF A STATOR OF A GAS-TURBINE ENGINE

FIELD OF THE INVENTION

The present invention relates to the field of gas-turbine engines, more particularly engines equipping aircraft, and relates to the detection of faults in a system for controlling the members modifying the operating state of the engine, such as the system regulating the pitch angle of the variable-pitch fins of the compressor stator.

PRIOR ART

In an engine equipping an aircraft, in particular a military aircraft, it is generally sought to manage failures in the regulation system so as to afford better tolerance to faults and to reduce the mission cancellation rate.

According to a known regulation method, control of the engine is based on a regulation architecture with two interlinked levels. This is composed of engine regulation loops and local regulation loops: the first control the state of the engine, for example its rotation speed or the output speed of the LP compressor; the second control the position of the actuators acting on the members modifying the state of the engine, which are the fuel metering devices, the input guiding wheel, the variable pitch stator fins, the exhaust nozzle or others.

The local regulation groups are composed of three parts: a computing part, a control part and a measuring part. The computing part produces the electric-current command to be applied to the actuators. This command is produced so as to ensure the convergence of the actual position of the actuators towards the desired position. The control part positions the output member of the actuator according to the current command. Finally, the measuring part assesses the position of the output member of the actuators.

The computing part is solely electrical and the control part also comprises mechanical means.

The electrical part is duplicated. It is generally of the dual-channel type and generally comprises two computers, each being able to send electric current to the actuators. The actuator is however controlled by only one computer at a time: the active computer. The other computer—the passive computer—is ready to take over in the event of malfunctioning of the first. There is then switching of the computer: the active computer becomes passive and vice versa.

As for the mechanical part, this is not duplicated; there is only one mechanical control channel.

Among the faults affecting the system controlling the local regulation groups, the faults are distinguished by the degree of importance of their magnitude. A simple fault corresponds to a transparent or temporary failure of the chain of command, whereas a double fault corresponds to a definitive failure.

Faults of electrical origin are also distinguished from those that are of mechanical origin since the maintenance actions to be performed in the case of simple control faults of the electrical type are not the same as those to be carried out in the case of simple control faults of the mechanical type. However, with certain engines, the type of control fault is not diagnosed by the regulation system. There are then risks that the maintenance actions are not suitable.

In the case of a dual-channel electrical control, when a simple control fault occurs, it causes the computer to switch. The failed electrical control channel becomes passive. Thus the single control fault is transparent in flight. However, for safety reasons, the maintenance procedures require the dismantling of an item of equipment—the computer or control unit concerned—on the ground.

The legitimacy of this dismantling varies according to the origin of the single control fault. It results either from the failure of one of the two electrical control channels, or from a temporary failure of the mechanical control channel. The latter may for example be transient contamination of the fluid driving the actuator preventing functioning thereof.

It appears that, when the origin of the single control fault is mechanical, dismantling is not justified.

DISCLOSURE OF THE INVENTION

The present invention aims to improve the management of faults in engines that do not have a diagnostic means of the single-control fault type. It thus relates to the implementation of a diagnosis of the control fault in a local regulation loop, in particular the loop regulating the pitch angle of variable-pitch stator fins. The purpose is to assist in determining the maintenance action in the case of single control faults.

Thus the invention relates to a method for differentiating control faults in a system controlling an actuator, the actuator having a movable member acting on the position of a member modifying the state of a gas turbine engine, the system comprising an electrical control and mechanical control, the electrical control comprising at least one computer for computing the desired position of the movable member of the actuator and transmitting an instruction signal to the single-channel mechanical control of the actuator, a fault being diagnosed when a difference is detected between the desired position of the actuator and its measured position during a given difference-confirmation period.

The method is characterised by the fact that the speed of movement of the actuator is measured and that a fault of electrical origin is diagnosed when, during said difference-confirmation period, the speed of movement measured remains zero or above a predetermined threshold speed, otherwise the fault is of temporary mechanical origin.

Through the method of the invention, a means is available for differentiating between an electrical fault which, for safety reasons and in accordance with the maintenance procedures, gives rise to the dismantling on the ground of an item of equipment and a temporary mechanical fault which objectively does not require dismantling. It is thus possible to decide not to proceed with the dismantling of the equipment concerned if the type of single mechanical fault is not repeated. If the fault of mechanical origin is repeated a certain number of times, three for example, it may be opportune to proceed with dismantling. In accordance with another, if the actuator is in the retracted position at the moment when the difference is detected and remains in the position during the determined difference-confirmation period, the system is declared to have a fault of an electrical origin.

This requirement is imposed by the fact that, since the electrical fault leads to an abrupt movement towards the retracted position, it is possible for the actuator to be in its retracted position before a difference is detected. In this case the speed remains zero during the monitoring phase, which would indicate erroneously a temporary mechanical fault.

In accordance with another feature, the value of the control signal being compared with a given threshold, if the signal is higher than said threshold, and the speed of movement is higher than the threshold speed, then the control fault is declared electrical.

The present invention concerns a control system using a single-channel or dual-channel electrical control. It applies in particular to the local loop regulating the actuator controlling the pitch angle of the variable-pitch fins of the engine compressor stator. It also applies to the local loop controlling the inlet directing wheel (IDW).

BRIEF PRESENTATION OF THE FIGURES

DETAILED DESCRIPTION OF AN EMBODIMENT OF THE INVENTION

Figure 1:
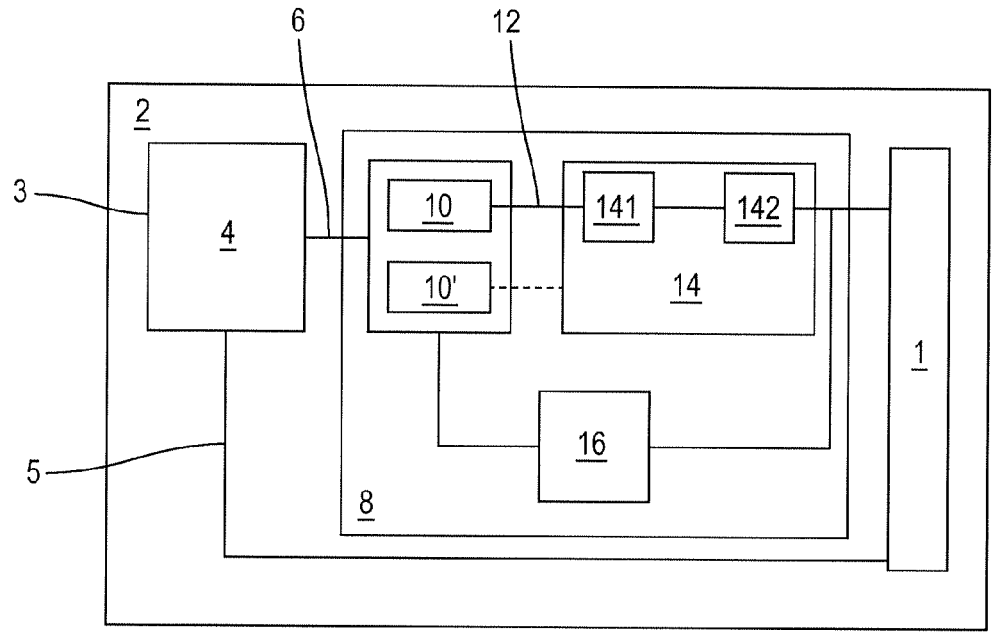
FIG. 1 illustrates the architecture of the regulation loops of a gas turbine engine.

The diagram in FIG. 1 relates to the architecture for regulation of a gas turbine engine propelling an aircraft. This engine is for example a double-slide engine with two concentric rotors rotating at different speeds, a low-pressure rotor and a high-pressure rotor. Each rotor comprises, on either side of the combustion chamber, a compressor compressing the air towards the combustion chamber and a turbine supplied by the combustion gas from the chamber and driving the compressor that is associated with it. The high-pressure compressor receives the air from the low-pressure compressor and the low-pressure turbine receives the gases partially expanded in the high-pressure turbine.

The control of this engine is based on a regulation architecture with two interlink levels. It is composed of engine-regulation loops 2 that control the state of the engine 1, in particular its rotor rotation speed and the output speed of the LP compressor.

The engine loops 2 are composed of three parts, a computing part 4, an engine part 1 and a part 5 measuring the parameters of the engine.

The computing part 4 fulfils the following functions:
definition of the desired state of the engine 1 according to the input parameters 3, which are the aircraft flight conditions and the gas control lever position;
computing the actual state of the engine according to the measurement supplied by the engine parameter measuring part 5;
computing the actuator position instruction 6. This instruction is produced so as to ensure the convergence of the measured state of the engine towards the desired state of the engine.

The engine part 5 has its state modified by the position of the actuators.

The measuring part 5 assesses the operating parameters of the engine.

Within the engine loops, the system comprises local regulation loops 8 that provide the position control of the actuators. These actuators, jacks in particular, act on the members modifying the state of the engine, namely the main fuel and post-combustion metering devices (it is a flow meter rather than a jack for the post-combustion) and where applicable the air inlet directing wheel, the variable-pitch stator fins, the exhaust nozzle and others. The present invention relates in particular to controlling the pitch angle of the variable-pitch stator fins. Varying the pitch of the stator fins makes it possible to optimise the functioning of the HP compressor of the engine and to increase its pumping range.

The local loops 8 are composed of:
a computing part 10 that produces the current command 12 to be applied to the actuators. The command 12 is produced so as to ensure the convergence of the actuator position measured at 16 towards the desired position;
a control part 14 that positions the actuator according to the current command;
a measuring part 16 that assesses the position of the actuators.

The control chain 10, 14, 16 comprises two parts:
An electrical part 10. This part transmits the electrical energy to the actuators.
A mechanical or hydromechanical part 14. This part transforms the electrical energy into mechanical energy. For a hydromechanical actuator, this part comprises a servo-valve 141 that controls the supply to the actuator, such as a pressurised fluid jack. It should be noted that the servo-valve itself comprises an electrical part with two duplicated control channels and a mechanical part.

The electrical part 10 may be duplicated. In this case it comprises two computers 10 and 10'. Each computer can send current 12 to the actuators, for example to the servo-valve 141 of a hydromechanical actuator. However, the actuator 14 is controlled by only one computer at a time: the active computer 10. The other computer 10' is passive and remains ready to take over in the event of malfunctioning of the first. There is then switching of computer: the active computer becomes passive and vice versa.

There are thus, in general, two electrical control channels. On the other hand, the mechanical part is not duplicated. There is only one mechanical control channel.

Presentation of Control Faults

A control fault is due either to a failure at one of the two electrical control channels 10, 10' or 12 and also at the electrical part of the servo-valve 141 (the coils in particular), or to a failure at the hydromechanical chain 141, 142. Faults of electrical origin are thus distinguished from faults of mechanical origin.

The control channel associated with the active computer is said to be faulty when there is a difference greater than a given threshold during a given confirmation period between the control response and the theoretical response. This confirmation period is evaluated using a theoretical model of the control chain.

Faults are also distinguished according to their degree of importance: single faults and double faults, or even higher.

The degree of importance of the fault (single or double) depends on the magnitude of the failure.

For faults of electrical origin, the magnitude of the failure is characterised by the number of electrical channels 10 or 10' concerned. In the case of a double-channel electrical control system, the failure on a single electrical control channel causes a single control fault. A failure on the two electrical-control channels 10 and 10' causes a double control fault. In the case of a system with a single electrical control channel, there is no longer any concept of single or double faults. A failure gives rise to the detection of a control fault.

For faults of mechanical origin, there is only one mechanical control channel. The magnitude of the mechanical failure varies according to the duration of the failure: definitive or temporary failure: the following table indicates the correspondence between the duration of the mechanical failure and the control fault that it causes.

| Duration of mechanical failure | Associated control fault | Name of mechanical failure |
| --- | --- | --- |
| Short | No control fault | Transparent failure |
| Medium | Single control fault | Temporary failure |
| High | Double control fault | Definitive failure |

A period is said to be short if it is less than the confirmation period: confirmation of the fault on the new active computer.

A period is said to be medium if it lies between the confirmation period and the sum of the following periods: confirmation period+inhibition period. The latter is the period during which the monitoring of the fault is inhibited following a switching of channels—this makes it possible to leave time for the new active computer to correct the positioning.

A period is said to be high if it is greater than the sum of the following periods: confirmation period+inhibition period.

Impact of Single Control Faults on the Availability of the Engine in the Case of a Double-Channel Electrical Control.

A single control fault gives rise to the switching of computers 10, 10'. The faulty control panel remains passive. The single control fault is thus transparent in flight. However, in accordance with the engine maintenance procedures according to the prior art and for safety reasons, this fault gives rise to the routine dismantling of an item of equipment—computer 10, 10' or control unit 14 of the actuator concerned—on the ground.

The legitimacy of this dismantling varies according to the origin of this single control fault. The origins of a single control fault are:

A failure of one of two electrical control channels
A temporary failure of the mechanical control channel.
  This may for example be transient contamination of the actuator.

In the case of a single control fault of mechanical origin, dismantling is not justified.

The following table presents the impacts, in terms of availability of the engine, of the single control fault.

| Origins of the single control fault | Impacts |
| --- | --- |
| Failure of an electrical control channel | No impact in flight Impact on the ground: dismantling justified |
| Temporary failure of the mechanical control channel | No impact in flight Impact on the ground: dismantling potentially unjustified |

Necessity of Differentiation of Control Faults

The above analysis shows that not dissociating the origins of single control faults leads to dismantling of equipment that is not justified. It is however the recommended maintenance procedure in the prior art as a safety measure.

It has been noted that, during a period of observation of several months, a not insignificant proportion of dismantling of the stator unit (comprising the variable-pitch fins) following single control fault was unjustified. Dismantling is said to be unjustified if no failure has been noted during investigations on the dismantled equipment.

It should also be noted that it would be possible to differentiate control faults by implementing monitoring of the control current. The current sent to the servo-valve 141 is re-read by the computer 10. The re-reading current is designated in the field as "wrap" current. This current is compared with the one produced by the computer. A difference between these two currents indicates a control fault of electrical origin. However, such a solution would result in a requirement in respect of the hardware and the operating system of the computer and, for an existing engine, this would assume a modification to the computer. To avoid such a modification, the solution of the invention, simple to implement in this case, has been developed.

In order to avoid inopportune dismantling in the case of a temporary fault on a mechanical control channel, it is necessary to differentiate single control faults according to their origins.

Analysis of the Effects of the Faults to be Distinguished

For a local group comprising a hydromechanical actuator, the control chain of a local regulation loop consists of an active computer 10 or 10' that produces the control current 12 to be sent to the servo-valve 141. This current is calculated so as to make the difference between the measured position of the actuator 142 tend towards the desired position produced by the engine loops. The servo-valve 141 supplies the flow to the chambers of the actuator. The supply pressures depend on the control current 12 received by the servo-valve 141. The speed of movement of the movable member of the actuator is determined by the supply flow rate.

The movement of the jack is proportional to the variation in control current.

An abrupt movement, that is to say at the maximum speed associated with the given flight conditions, of the movable member of the actuator (jack) towards the retracted position corresponds to zero current. An abrupt movement, that is to say at the maximum speed associated with the given flight conditions, of the movable member of the actuator (the jack) in the opposite position to the retracted position, corresponds to the maximum current. A double-stage servo-valve is described in the U.S. Pat. No. 3,023,782.

Effects of Faults in an Electric Control Channel

Faults in an electric control channel are generally due either to an open circuit or to a short-circuit. A short-circuit is detected by the computer circuit breaker, which then demands zeroing of the current sent. These two types of failure cause the zeroing of the current read by the servo-valve 141, which then demands the abrupt movement of the jack towards its retracted position.

An electrical control fault may also be due (5% of cases) to a drift in the current sent by the computer. The drift in the current sent by the computer causes a shift in the response of the servo-valve. This shift is compensated for by the feedback loop but all the same causes an increase in the response time of the loop.

Effects of Temporary Faults on the Mechanical Control Channel

Temporary failures of the mechanical control channel result from a jamming of the slide of the servo-valve in the case of transient contamination.

Analysis shows that there exists two types of slide jamming: wedging of particles between the slide and the casing or shearing of particles between slide and supply outlet of the jack chambers. The effect of the first type is to increase friction on the slides. The current/output curve exhibits hysteresis. In other words, the response time of the control chain is increased.

A particle that becomes wedged between the slide and the supply output of a jack chamber will be sheared. The slide is blocked during the shearing time (which may take a long enough time to raise a control fault). The supply pressure of the jack chambers is kept constant during blocking. This can happen only around the equilibrium position of the slide (closure of the supply outlet of the jack chambers), and therefore at low speeds.

Temporary faults in the mechanical control channel are thus due to a momentary reduction in the performances of the actuators. The response time of the loop is increased.

The above analysis shows that the majority of faults in an electrical control channel can be differentiated from temporary faults in the mechanical control channel through their abruptness.

A small percentage (5%) of control faults of electrical origin have effects similar to the single control faults of mechanical origin.

Method of Differentiating Single Control Faults of Different Origins

The method of the invention is based on the finding that an electrical fault in 95% of cases causes movement of the jack at the maximum speed for given flight conditions towards the retracted position, whereas as temporary hydro-mechanical fault restricts the jack movement speed range.

Thus monitoring of the speed of the jack makes it possible to distinguish an electrical fault from a temporary hydro-mechanical fault.

The speed of the jack is monitored at the time of the failure, that is to say from the detection of a difference between the response of the control and the theoretical response, until the control fault is confirmed, just before the switching of the computer. This corresponds to the control fault confirmation phase.

A threshold speed is determined by calibration during engine tests. It is determined so as to be less than the speed associated with an electrical control fault of the open circuit or short-circuit type. It is assessed by zeroing the current sent to the servo-valve of the actuator.

If the jack moves in the direction of the retracted position and the speed of the jack is higher than the threshold speed during the control fault confirmation phase, then the fault is said to be of electrical origin. Otherwise the fault is said to be of mechanical origin.

Particular Cases to be Taken into Account

Condition with Respect to the Position

An electrical fault causes an abrupt movement towards the retracted position. It is possible for the jack to reach the retracted position before a difference is detected between the response of the feedback and the theoretical response. In this case, the speed remains zero during the monitoring phase. It is therefore necessary to add the following condition: if the jack is in the retracted position during the control fault confirmation phase, then the fault is said to be of electrical origin.

Condition with Respect to the Current

In the case where the control current calculated is zero, a mechanical control fault may cause a movement in the direction of the retracted position and that the speed of the jack is higher than the threshold speed during the control fault confirmation phase. In order not to misunderstand the origin of these mechanical control faults, it is necessary to add a condition with respect to the current.

In the case of an electrical control fault, there is inconsistency between the calculated control current and the control current actually received by the servo-valve. The control current calculated is determined so as to slow down the jack or even reverse its direction of travel. The calculated control current is not close to zero in the case of an electrical control fault.

The control fault is said to be electrical if the movement of the jack is abrupt while the control current is not low.

Because of a differentiation of control faults, the dismantling logic following a single control fault can be modified. The differences are indicated in the following table.

N.B.: A repetition of single control faults during a flight indicates an abnormal situation. Dismantling is considered to be necessary in this case. The repetition threshold is fixed at 3.

| Diagnose origin of single control fault | Number of single faults during flight | Maintenance logic with differentiation of control faults |
| --- | --- | --- |
| Electrical origin | Indifferent | Dismantling |
| Mechanical temporary origin | <3 | No dismantling |
| | >3 | Dismantling |

It should also be noted that this differentiation between electrical control faults and mechanical control faults makes it possible to do away with tests on the ground of the dismantled equipment, whether the system be single or double electrical control channel.

Figure 2:
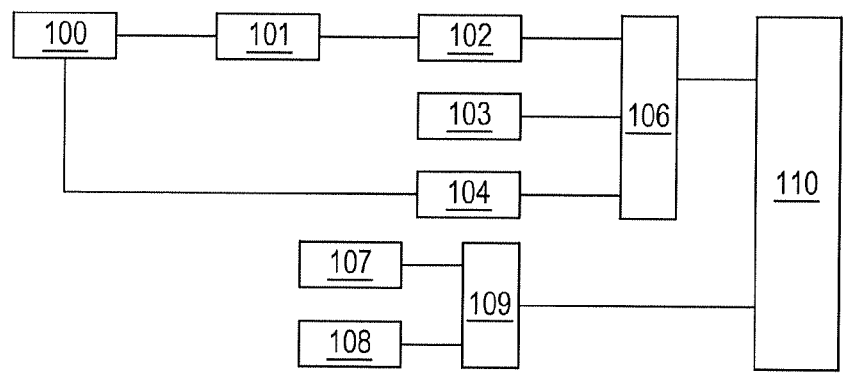
FIG. 2 is a block diagram of the various steps performed during the method for differentiating single control faults of the invention.

FIG. 2 is a logic diagram of the various operations. The references thus designate the following operations:

100: the position X of the movable member of the actuator is measured;

101: the speed V of the movable member is worked out from the position;

102: the speed V is compared with the threshold speed;

103: the control current is compared with the low control current threshold;

104: the position of the movable member of the actuator is compared with a given stop position;

106: a differentiation indication is worked out from the results of 102, 103 and 104 monitored for a period corresponding to the phase confirming a control fault in the actuator;

107: verification of the absence of fault in the sensor sensing the position of the movable member of the actuator;

108: verification of the control for detection;

109: verification that the two conditions are fulfilled;

110: the differentiation indication is taken into account only in the case of control fault detection.

The invention claimed is:

1. Method for differentiating control faults in a system controlling an actuator acting on the position of a member modifying the state of a gas turbine engine, the system comprising an electrical control and a mechanical control, the electrical control comprising at least one computer, said method comprising the following steps:

calculating a desired position of a movable member of the actuator by the computer, transmitting an instruction signal to a single-channel mechanical control of the actuator, diagnosing a control fault when a difference is detected between the desired position of the movable member of the actuator and a measured position of the movable member for a given difference-confirmation period, measuring a speed of movement of the actuator, determining if the control fault is of electrical origin when, during said difference-confirmation period, the speed of movement measured remains zero or above a predetermined threshold speed, otherwise determining the control fault is of temporary mechanical origin.

2. Method according to claim 1, wherein if the actuator is in a retracted position when the difference is detected and remains in the retracted position for the given difference confirmation period, the control fault is determined to be a control fault of electrical origin.

3. Method according to claim 1, wherein the value of the instruction signal is compared with a given threshold, and if the instruction signal is above said threshold and the speed of movement is higher than the threshold speed, then determining the control fault is of electrical origin.

4. Method according to claim 1, the actuator controlling the position of stator fins of an engine compressor of the gas turbine engine.

5. System for controlling an actuator acting on the position of a member modifying the state of a gas turbine engine, the system comprising an electrical control and a mechanical control, the electrical control comprising at least one computer only one said computer being active at a time, arranged to compute a desired position of the movable member of the actuator and to transmit an instruction signal to a single-channel mechanical control of the actuator, said system further comprising elements for measuring the position of the movable member of the actuator and said at least one said computer being further configured for diagnosing a fault when a difference is detected between the desired position of the movable member of the actuator and its measured position for a given difference-confirmation period, wherein the system comprises an indicator differentiating control faults of the actuator, the system further comprising elements for measuring the speed of movement of the movable member of the actuator, and elements for comparing the speed of movement with a threshold speed and a fault differentiation and indicating means such that the system diagnoses a fault to be of electrical origin when, during said difference-confirmation period, the measured speed of movement remains zero or higher than the predetermined threshold speed, otherwise the system determines the fault to be of temporary mechanical origin.

6. System according to claim 5, comprising a double-channel electrical control with one computer per channel, only one being active at a time.

\* \* \* \* \*